(12) United States Patent
Farkas et al.

(10) Patent No.: US 7,996,839 B2
(45) Date of Patent: *Aug. 9, 2011

(54) HETEROGENEOUS PROCESSOR CORE SYSTEMS FOR IMPROVED THROUGHPUT

(75) Inventors: Keith Farkas, San Carlos, CA (US); Norman Paul Jouppi, Palo Alto, CA (US); Parthasarathy Ranganathan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1641 days.

This patent is subject to a terminal disclaimer.

(21) Appl. No.: 10/621,067

(22) Filed: Jul. 16, 2003

(65) Prior Publication Data

US 2005/0013705 A1 Jan. 20, 2005

(51) Int. Cl.
*G06F 9/46* (2006.01)
*G06F 15/76* (2006.01)
*G06F 11/30* (2006.01)

(52) U.S. Cl. .......... 718/102; 718/100; 718/104; 712/32; 702/182

(58) Field of Classification Search .......... 718/102, 718/100, 104, 105; 702/182, 186; 703/22; 712/32–34
See application file for complete search history.

(56) References Cited

U.S. PATENT DOCUMENTS

| | | | | |
|---|---|---|---|---|
| 4,495,562 A | * | 1/1985 | Yamaji et al. | 718/105 |
| 5,838,976 A | * | 11/1998 | Summers | 717/130 |
| 5,913,068 A | * | 6/1999 | Matoba | 713/322 |
| 6,006,248 A | * | 12/1999 | Nagae | 718/105 |
| 6,332,178 B1 | * | 12/2001 | Dean et al. | 711/118 |
| 6,986,141 B1 | * | 1/2006 | Diepstraten et al. | 718/108 |
| 7,093,147 B2 | * | 8/2006 | Farkas et al. | 713/320 |
| 2003/0088610 A1 | * | 5/2003 | Kohn et al. | 709/107 |
| 2003/0110012 A1 | * | 6/2003 | Orenstien et al. | 702/188 |
| 2004/0111708 A1 | * | 6/2004 | Calder et al. | 717/131 |

FOREIGN PATENT DOCUMENTS

KR 2001067341 A * 7/2001

OTHER PUBLICATIONS

Schmeck, Hartmut et al., "Trends in Network and Pervasive Computing—ARCS 2002", Springer, Apr. 2002.*
Hong, I. et al., "PowerOptimization of Variable-Voltage Core-Based Systems", IEEE, vol. 18, Issue 12, Dec. 1999, pp. 1702-1714.*
Kumar et al. "Processor Power Reduction Via Single-ISA Heterogeneous Multi-Core Architectures", IEEE Computer Architecture Letters, vol. 2, Apr. 2003, pp. 1-4.*
Kumar et al. "Processor Power Reduction Via Single-ISA Heterogeneous Multi-Core Architectures", IEEE Computer Architecture Letters, vol. 1, Issue 1, Jan. 2002, Abstract.*
Paker et al., "A heterogeneous multi-core platform for low power signal processing in systems-on-chip", Sep. 24-26, 2002, Solid-State Circuits Conference, 2002. ESSCIRC 2002. Proceedings of the 28th European, pp. 73-76.*

* cited by examiner

Primary Examiner — Kenneth Tang

(57) ABSTRACT

A computer system for maximizing system and individual job throughput includes a number of computer hardware processor cores that differ amongst themselves in at least in their respective resource requirements and processing capabilities. A monitor gathers performance metric information from each of the computer hardware processor cores that are specific to a particular run of application software then executing. Based on these metrics, a workload assignment mechanism assigns jobs to processor cores in order to maximize overall system throughput and the throughput of individual jobs.

22 Claims, 2 Drawing Sheets

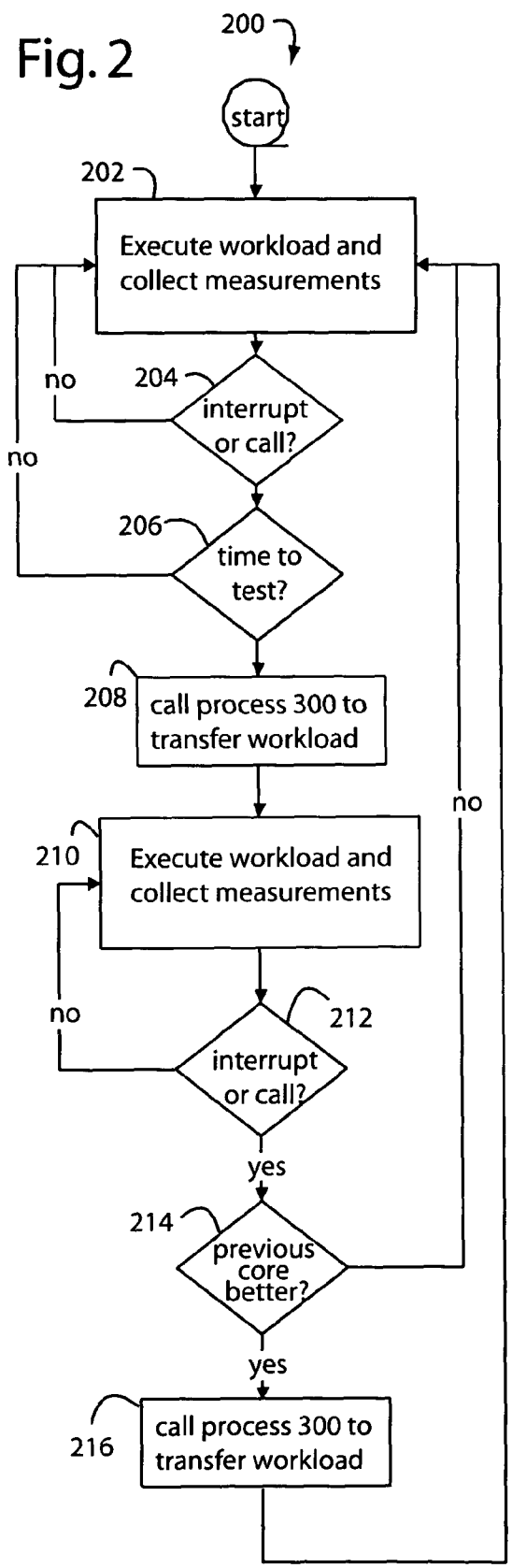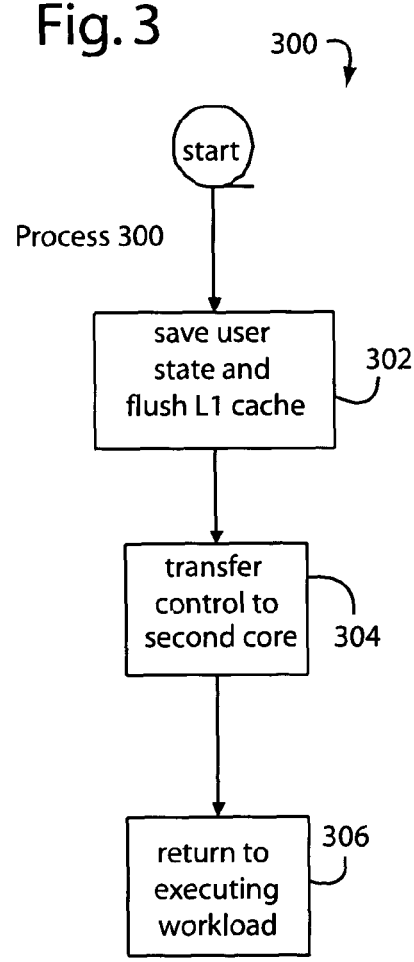

HETEROGENEOUS PROCESSOR CORE SYSTEMS FOR IMPROVED THROUGHPUT

FIELD OF THE INVENTION

The present invention relates to computer systems, and more specifically to methods and devices for improving throughput by using multiple processor cores of different sizes and complexity to match the processing tasks then running.

BACKGROUND OF THE INVENTION

Large computer systems can rely on many processors to run many processes or threads simultaneously. Each job typically runs on one given processor, with several processes or threads running in sequence. In general, the overall system throughput should be as high as possible without too much sacrifice of individual process or thread response-time and throughput.

Large systems that do web indices searching, online transaction processing, etc., can experience wide variations in the number of processes or threads they must run at any one time.

Chip-level multiprocessors have recently started to be marketed that integrate several identical processors on one chip. It has not been clear just how complex the replicated processor should be. For many applications, the more complex the processor, the higher will be the performance. But performance from complexity comes at a price, the marginal die area increase required for a complex processor over a simple processor is much greater than the resulting performance benefit. For example, if the complexity of a processor is increased so that its chip area is quadrupled, its performance may be only doubled. An increase in complexity may be of little or no benefit for certain software jobs, e.g., transaction processing workloads. These jobs were found to do almost as well on simple cores as compared to complex cores.

SUMMARY OF THE INVENTION

An object of the present invention is to provide a method for improving system throughput in computing devices.

Another object of the present invention is to provide a computer system with high performance on a per process or thread basis.

Briefly, a computer system embodiment of the present invention comprises a number of processor cores consigned to a pool. At least some of these processor cores differ in their respective levels and mix of complexity, resources, performance, and other important measures. Such processor cores can be arranged in a linear order according to estimates of one or more of these measures. In general, the larger and more complex processor cores will require significantly more area than the smaller and less complex processor cores. Such increase in area is also significantly larger than the performance increase afforded by the larger more complex core. Since the number of jobs, processes, or threads that are available to run varies with time, different strategies can be used to maximize throughput. If only a few jobs are pending, they can be assigned to the larger more complex processor cores. As more jobs demand attention, successively smaller less complex cores can be used for each additional job. Such maximizes overall system throughput, as well as the average throughput of individual jobs. Each job performs proportionally the same on the different cores, e.g., a first job would have twice the throughput on core A as core B, while a second job would also have twice the performance on core A as core B.

An advantage of the present invention is that a computer system is provided with high performance.

A further advantage of the present invention is that a computer system is provided that is relatively inexpensive.

Another advantage of the present invention is that a computer system is provided that maximizes resource utilization.

These and other objects and advantages of the present invention will no doubt become obvious to those of ordinary skill in the art after having read the following detailed description of the preferred embodiment as illustrated in the drawing figures.

DESCRIPTION OF THE DRAWINGS

FIG. 2 is a flowchart diagram of a process embodiment of the present invention for timing the transfer of software jobs amongst dissimilar cores in a multi-core processor-core pool; and FIG. 3 is a flowchart diagram of a process to transfer workloads between processors that is called in the program diagrammed in FIG. 2.

DETAILED DESCRIPTION OF THE EMBODIMENTS

Figure 1:
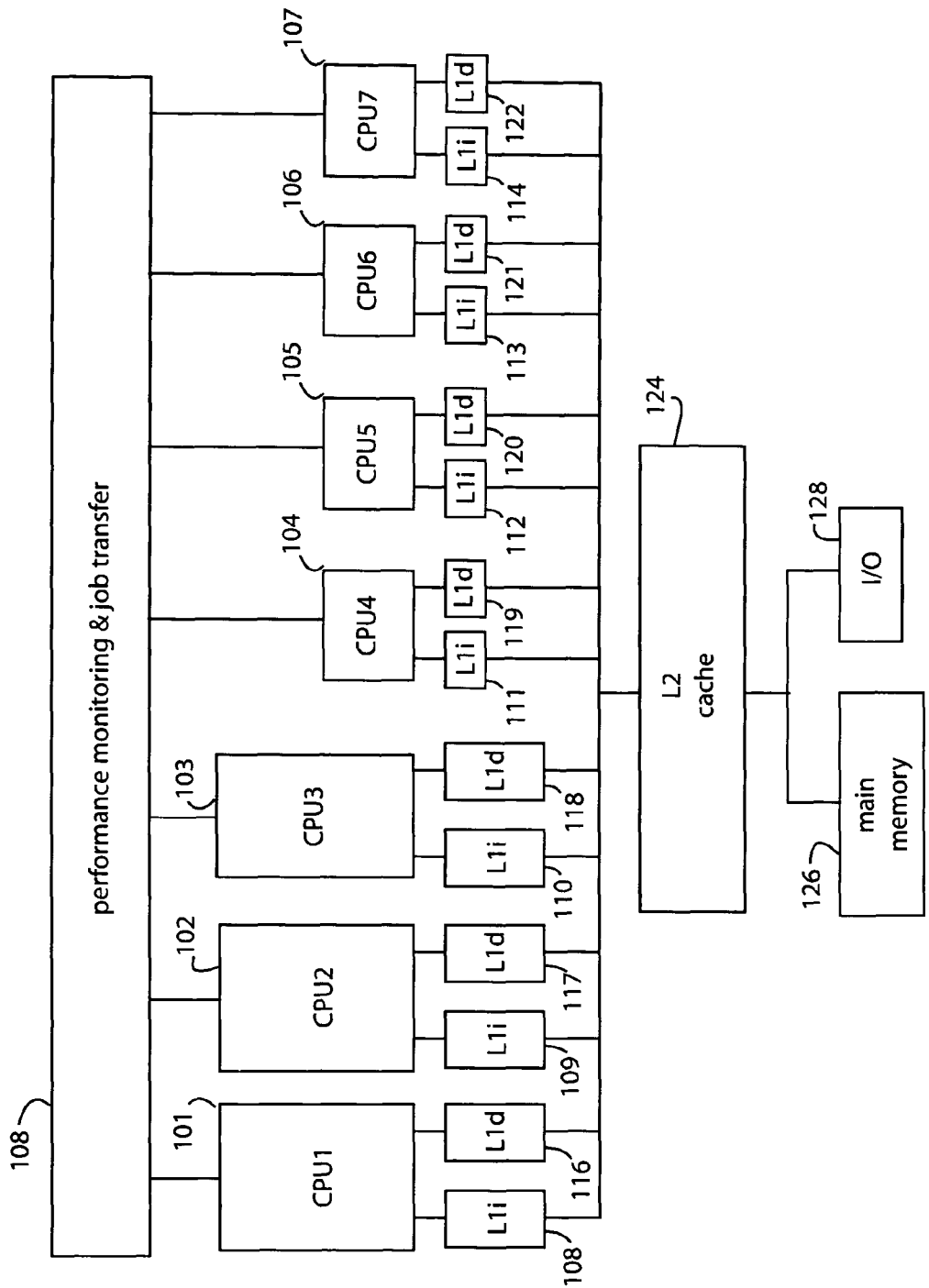
FIG. 1 is a functional block diagram of an embodiment of the present invention comprising multiple processor cores.

FIG. 1 illustrates a multi-core processor system embodiment of the present invention, and is referred to herein by the general reference numeral 100. Multi-core processor system 100 is a heterogeneous multicore and core-switching implementation in a chip-level multi-core processor (CMP) with multiple, diverse processor cores that all execute the same instruction set. In this implementation, there are two types of processor cores, each with significantly different resources and demonstrating significantly different performance and area efficiency levels for the same application software. E.g., they differ in throughput for a given amount of chip area. Operating system software matches the applications to different cores during an application's execution. For example, to make the best use of the available hardware while maximizing area efficiency and the performance of individual jobs.

The system 100 hosts an operating system and application software for single-threaded or multi-threaded execution. Such operating system dispatches processing jobs to the two types of processor cores according to their chip area, power consumption, available resources, relative speeds, and other important measures.

The dissimilarity in the processor cores is represented in FIG. 1 with different sized boxes. A set of larger die-area and higher throughput cores are labeled CPU1 101, CPU2 102, and CPU3 103. Another set, of relatively smaller die-area and lesser throughput cores are labeled CPU4 104, CPU5 105, CPU6 106, and CPU7 107. Each such processor core 101-107 is able to execute a plurality of processes and threads at one time. It can also be advantageous to use processor cores that can operate at different power states, e.g., different clock frequencies and/or different voltage levels.

The processor cores 101-107 report operational metrics to a performance monitor 108 related to software program execution. These metrics can include, e.g., the number of instructions executed per second, the number of cache misses per instruction, etc.

Each processor core 101-107 has a corresponding first level instruction cache (L1i) 108-114, and a corresponding first level data cache (L1d) 116-122. These all share a common second level cache (L2) 124, a main memory 126, and input/output (I/O) peripheral system 128. Operating system and application software execute from main memory 126 and are cached up through to the respective second and first level caches to processor cores 101-107.

In one embodiment, a timer is used to periodically interrupt the operating system, e.g., every one hundred time intervals. If there are more jobs available to run than large complex processors, then the available jobs are run first on one processor type and then switched to another processor type. For example, some jobs may be run on large complex processors and then switched to smaller simpler processors while other jobs are first run on small processors and then switched to large complex processors. The test can sample the execution of the application for 1-2 time intervals.

A mechanism identifies the throughput achieved by the different cores as a function of the workloads running on them. The metrics of interest may either be the total throughput achieved by the system, the throughput-area product of the system, etc. Additionally, in an alternative embodiment, the metrics of interest may also include the throughput-power product of the system. The decision to reassign the workloads to different cores is based on the metrics obtained during the test intervals, as well as other additional user-defined or workload-defined metrics. Some assignments can be either static or dynamic.

Computer system embodiments of the present invention consign a number of processor cores to a resource pool. At least some of these processor cores differ in their respective levels and mix of complexity, resources, performance, and other important measures. Such processor cores can be arranged in linear order, e.g., according to estimates of one or more measures. In general, the larger and more complex processor cores will require significantly more die-area than the smaller and less complex processor cores. Such increase in die-area provides diminishing returns, e.g., significantly larger die-areas yield only modest performance increases.

The number of jobs to run typically varies, so different strategies can be used to maximize throughput that look at the number of pending jobs. If only a few jobs are ready, they can be assigned to the larger more complex processor cores. As more jobs present themselves, successively smaller, less complex cores are assigned. Such maximizes overall system throughput, as well as the average throughput of individual jobs. It is assumed that each job performs proportionally better on the larger cores. E.g., a first job would have twice the throughput on core-A as core B, while a second job would also have twice the performance on core-A as core-B. Such assumption may not always hold.

A heterogeneous system with different-capability processor cores can have a higher average system throughput than a homogeneous system, with multiple copies of the same processor core, while still maximizing average individual job throughput.

For example, consider a system with N-number of large complex processors that are all identical, and all consume the same area on a die. If 1 . . . N copies of a job are available to run, e.g., 1 . . . N different web queries, then 1 . . . N processor cores can be used, one per job. Each will have roughly equal throughput. However, if there are N+1 jobs to run, the N+1th job must wait for one of the other jobs to complete before it can run. While it is waiting it effectively has zero throughput. While the system throughput remains N, the average job throughput per job has decreased to N/(N+1).

Now consider a system where one of the large complex processor cores is replaced by four small less complex processor cores with half the performance of the large complex core that together consume the same area as a single large complex core. If there are from 1 to N−1 jobs available to run, these jobs can all run on large complex cores as before, with the same system throughput and the same average individual job throughput. When there are exactly N jobs to run, the system throughput will be (N−1)+½ instead of N as in the original case.

But in this case when there are more than N jobs to run, e.g., N+1, N+2, or N+3, there are smaller less complex processor cores available for running these jobs. If there are N+1 jobs in this system, the heterogeneous system throughput will be the same as the homogeneous system with N high-performance jobs. When there are N+2 or N+3 jobs available to run, the heterogeneous system will have higher system throughput than a homogenous system constructed from N high-performance cores. Since the heterogeneous system has higher system performance in two cases while the homogeneous system has higher performance in one case, if the number of jobs at a given point in time is equally distributed from 1 to N+3, or larger, than the heterogeneous system will have higher average system throughput. It is often the case that the system will be more likely to have fewer jobs to run than more jobs, so the case of N−1 jobs is probably more likely than N+2 or N+3 alone, but the probability of having either N+2 or N+3 jobs still should outweigh the probability of having exactly N Jobs to run.

This simple example can be extended to systems with more than two sizes of processors, with similar benefits. It can also be extended to systems with more than one large complex processor replaced by small less complex cores. However one would not want a system where all the cores were small and less complex. In this case, when only a few jobs were available to run, a system having only small less complex cores would have significantly lower average system and individual job throughput than a system with a diverse set of cores. When a system with only small less complex cores only has a few jobs to run, most of its die area would be idle and wasted. Thus a system with a mix of both large complex processors and small simple processors would have superior average system and individual job throughput in comparison to systems having multiple copies of the same core for a given total die area.

Given a heterogeneous system, there are several optimizations that are possible to increase average system and individual job throughput that are not available in a homogeneous system. First, in reality not all jobs would have the same relative performance on different cores. Some applications may benefit from the use of large complex cores, while others may not. For example, Gharachorloo et. al. has shown that transaction-processing workloads derive little performance benefit from large complex cores. In practice, each application will achieve different speedups on different cores. In a heterogeneous system, we can take advantage of this diversity to maximize both system and average individual job throughput. In cases where there are more jobs to run than large complex cores available, we can run the jobs that benefit the most from a large complex core on the large complex cores available while running the others on smaller simpler cores. If there is significant core diversity, the best assignment of jobs to cores can yield significantly higher performance than the average performance obtained with random assignment of jobs to cores.

The relative performance of jobs on cores of different size and complexity can be ascertained in a number of ways. The simplest method would be to have the jobs annotated by users or annotated from profiling of previous runs. Such results in static assignments for the duration of an application's execution. Another method would be to monitor the performance of jobs on the system in real time, to move jobs from one size processor to another, and to compute the relative performance obtained on different cores. Such results in a dynamic assignment. Dynamic assignment has somewhat more complexity and slightly larger overhead, but it has several advantages. First, applications can have different performance on a processor core depending on their input data sets. Second, applications can have different performance during different phases of their execution. Neither of these can be encapsulated in a single static annotation, while a system with dynamic job assignment would automatically take such variations into account.

When there are more jobs to run than high-performance cores available in a heterogeneous system with dynamic job assignment, an operating system associated with the processor core pool dispatches the execution of application programs to various processor cores and monitors their resulting performance. Alternatively, such control is implemented in firmware or special-purpose hardware. Such performance can be measured with simple metrics such as instructions per second. Metrics are collected on how well an application runs on a particular processor core in the pool, for example during a one millisecond period. After several milliseconds of swapping execution of jobs between cores and monitoring their resulting performance, the operating system can build a table with the relative performance of each job on each type of core.

There are many well-known optimization techniques that can then be applied for assigning jobs to processor cores for a longer period. For example, a greedy approach would select the job that benefits the most from a large complex processor to run on the first large complex core available. Then it would select the job that benefited next most from a large complex core to run on the second large complex core available. Such would continue until all the large complex cores were active, at which point a similar procedure could be followed to assign jobs to the next most complex cores, etc. Such process would end either when all available jobs were assigned or all processors were busy. The system would then likely run with this assignment for several hundred milliseconds.

As jobs are completed and new jobs arrived, the new jobs are run on cores of different size and complexity, and their resulting performance monitored. After some long period, e.g., several hundred milliseconds, jobs still running may have transitioned to different phases or data sets, and their performance characteristics on different cores could have changed. For such long running jobs, after an extended period of running on one core they would be briefly run on different cores again to measure their performance for different core sizes and complexities. Any changes could then be taken into account by a new assignment of jobs to processors.

Heterogeneous systems have many other benefits over homogeneous systems. For example, jobs of different priorities can be assigned to cores of different size and complexity. Similarly scheduling could be based on service-level agreements that have a range of performance they guarantee based on other constraints like system load or the time of day. These and other objects and advantages of the present invention will no doubt become obvious to those of ordinary skill in the art after having read the following detailed description of the preferred embodiment as illustrated in the drawing figures.

FIG. 2 represents a method embodiment of the present invention for assigning jobs to cores in the multi-core processor-core system 100 of FIG. 1. Such method is referred to herein by the general reference numeral 200. The method 200 is preferably implemented as a part of an operating system for multi-core processor-core system 100.

Method 200 begins with a step 202 that collects statistics or metrics as workloads execute on given processor cores. The statistics relate to their execution, performance, and other metrics. A step 204 continues this monitoring process until a periodic interrupt occurs. Interrupts can be generated by a timer, an operating system (OS) call, etc. In a step 206, such periodic interrupt is serviced, and a check is made to see if it is time to evaluate how well the workloads execute on other types of cores. The other cores will differ, e.g., in a greater number of hardware resources, or one that is more area efficient.

If it is not time to try other cores, then control returns to continue executing workloads on their current cores. If it is time to try other cores, then the execution of workloads are transferred in a step 208 to a different type of core. Such calls a process 300 diagrammed in FIG. 3. In a step 210, statistics are collected about their execution, performance, and other metrics as workloads execute on their respective processor cores. A step 212 continues monitoring until a periodic interrupt occurs. A timer or an operating system (OS) call can be used to generate these interrupts. In a step 214, the interrupt is serviced, and a check is made to determine if a different assignment of processes to cores would improve throughput. Is so, executing jobs are moved between processor cores according to the new improved assignment. If not, the same assignment of processes to cores is used.

The system and method for transferring processes between cores is illustrated in FIG. 3. Referring now to FIG. 3, in a step 302, the state of the application is saved to memory, and the current processor core's cache is flushed. A step 304 transfers software control to the other core. The other core executes a special transfer program, e.g., as a part of the operating system. In a step 306, program control returns to the workload which begins executing at the point it reached when interrupted, e.g., steps 208 and 216 (FIG. 2).

Embodiments of the present invention are based on multi-core architectures in which the processor cores all execute a common instruction set, but they each have different capabilities and performance levels. At run time, system software evaluates the resource requirements of an application and chooses the core that can best meet these requirements while maximizing total system throughput and the throughput of individual jobs.

It was realized by the present inventors that diverse applications express varying resource requirements during their execution. For example, applications which have a large amount of instruction-level parallelism (ILP), can be efficiently serviced by large cores that can issue many instructions per cycle such as a wide-issue superscalar CPU. But this same core, could be wasted on an application with little ILP that would perform just as well on a smaller simpler core. By providing both large and small cores, many small cores can be implemented in the space required for a single large core. If the throughput for some applications or phases of applications is not significantly different for large cores versus small cores, the overall system throughput can be significantly increased by migrating such jobs to smaller cores and running jobs that can benefit the most from large complex cores on the larger cores.

The cores selected for a heterogeneous multicore processor core design should have a wide range of area usage while still providing significant throughput. Power consumption may also be a design parameter. Using the Digital Equipment (now Hewlett-Packard) Alpha processor core series as an example of this, if the processors were all scaled to a common 0.1 um process technology they would range in size from 2.87 to 24.5 square mm.

Each core has a different area efficiency for the same workload. Typical programs go through phases with different execution characteristics, the best core during one phase may not be best for the next phase. However, assuming the scaling above, the performance of the 21164 core (EV5) would be expected to be greater than half that of the 21264 core (EV6), even though it uses almost one-fifth of the area.

In alternative embodiments, one or more of the processor cores may include a number of different operating states that impact the throughput a workload will achieve running on each such core or the energy consumed.

In one such embodiment, these operating states include the ability to operate the processor at a number of different clock frequencies or at corresponding different voltage levels. In another such embodiment, such states also include run-time configurable hardware structures such as first level data caches that offer a number of run-time selectable associatives. In many such embodiments, the inclusion of these operating states provides the operating system with additional dimensions that it can leverage beyond the primary dimension of different processor cores.

For example, in one such alternative embodiment wherein the processor cores include voltage and frequency scaling, the metric of interest may be throughput per unit of energy spent. The operating system would thus take into account the amount of energy spent by the workload when allocating it to the processor cores. There is a cost associated with transferring program execution to another core, so the granularity of switching should be restricted to keep such costs insignificant. One method of restriction switches only at operating system time slice intervals, e.g., when execution is in the operating system, and the user states have already been saved to memory.

Referring now to FIG. 1, when the operating system decides a transfer of software execution to a next core is needed, it triggers an L1d cache flush to save all dirty cache data to the shared L2 124, and a signal is sent to the new core to start at a predefined operating system entry point. The new core returns, from the timer interrupt handler. The user state saved by the old core is loaded from memory into the new core as a usual consequence of returning from the operating system. Alternatively, workloads can be transferred to different cores at the granularity of the entire application, or chosen statically.

In general, a computer system embodiment of the present invention includes a plurality of computer processor cores in which at least two differ in processing performance, and in which all execute the same instruction set. A performance measurement and transfer mechanism distributes a plurality of computer processing jobs amongst the plurality of computer processor cores according to a best fit of processor hardware availability to processing software requirements. An operating system is typically hosted on the plurality of computer processor cores and includes the performance measurement and transfer mechanism. It provides for a periodic test of whether a particular computer processing job would be a better fit of processor hardware availability to processing software requirements on a different hosted one of the plurality of computer processor cores.

Alternatively, the operating system hosted on the plurality of computer processor cores includes the performance measurement and transfer mechanism. It does a periodic test of whether a particular computer processing job was a better fit of processor hardware availability to processing software requirements on a previously hosted one of the plurality of computer processor cores.

As a further alternative embodiment, an operating system is hosted on the plurality of computer processor cores for making performance measurements and transfers. A test of particular operating states within each of the computer processor cores is made in a decision as to where to place a given processing software workload. Such operating states could be dependent on at least one of the operating voltage and clock frequency of a corresponding one of the plurality of computer processor cores. The operating states may also be dependent on a run-time re-configuration of hardware structures of corresponding ones of the plurality of computer processor cores.

A method embodiment of the present invention places a plurality of computer processor cores on a single semiconductor die. At least two such computer processor cores differ in processing performance, and all execute the same instruction set. The performance of each of a plurality of computer processing jobs hosted amongst the plurality of computer processor cores is measured. Individual ones of the plurality of computer processing jobs are transferred amongst targeted ones of the plurality of computer processor cores according to a best fit of processor hardware availability to processing software requirements. A periodic test is made of whether a particular computer processing job would be a better fit of processor hardware availability to processing software requirements on a different hosted one of the plurality of computer processor cores. Conversely, a periodic test is made of whether a particular computer processing job was a better fit of processor hardware availability to processing software requirements on a previously hosted one of the plurality of computer processor cores. Tests of particular operating states within each of the computer processor cores can be used in a decision as to where to place a given processing software workload. Such operating states may be dependent on at least one of the operating voltage and clock frequency of a corresponding one of the plurality of computer processor cores. The operating states can also depend on a run-time re-configuration of hardware structures of corresponding ones of the plurality of computer processor cores.

In general, a target processor core from a pool being sought for a job is the one that yields acceptable performance. A balance with other measures can be determined statically for each workload based on data from prior executions of the workload. Alternatively, such balance may be obtained dynamically by empirically determining it at run-time. Metrics are collected on how well an application runs on a particular processor core in the pool, for example during a one millisecond test period. If the current processor core is yielding better results than a previous processor core, then the job will not be transferred, and will be allowed to continue executing. If not, the job can be returned to the previous processor core in the ordered pool or a next processor core can be tried. The resource requirements between application programs can vary, as well as the requirements at different times within a single application.

The associating of workloads for execution on specific processor cores can be advantageously based on at least one of user and application hints. In other words, the user or the application itself can provide suggestions or clues on what would be appropriate in the way of processing capabilities. The design choices in what processing performance levels to provide with the hardware can depend on a forecast of particular processing jobs that will be executed.

Although the present invention has been described in terms of the presently preferred embodiments, it is to be understood that the disclosure is not to be interpreted as limiting. Various alterations and modifications will no doubt become apparent to those skilled in the art after having read the above disclo-

What is claimed is:

1. A computer system, comprising:
a plurality of computer processor cores in which at least two of the computer processor cores are heterogeneous, and wherein the plurality of computer processor cores are configured to execute the same instruction set; and
a performance measurement and transfer mechanism configured to move a plurality of executing computer processing jobs amongst the plurality of computer processor cores by matching requirements of the plurality of executing computer processing jobs to processing capabilities of the computer processor cores.

2. The computer system of claim 1, further comprising:
at least one of an operating system hosted on the plurality of computer processor cores, firmware, and hardware that includes the performance measurement and transfer mechanism, and the at least one of the operating system, firmware, and hardware is configured to provide for a periodic test to determine relative performance of different computer processing jobs on different ones of the computer processor cores.

3. The computer system of claim 1, wherein the performance measurement and transfer mechanism is configured to maximize total system throughput.

4. The computer system of claim 1, wherein the performance measurement and transfer mechanism is configured to transfer the executing computer processing jobs to a new assignment amongst the plurality of computer processor cores, collect performance statistics about execution at the new assignment, and then determine whether to reassign the executing computer processing jobs to different computer processor cores based on the performance statistics collected.

5. The computer system of claim 4, wherein the determination of whether to reassign the jobs to different computer processor cores also is based on at least one of a user-defined metric or a workload-defined metric.

6. The computer system of claim 1, wherein movement of the executing computer processing jobs is constrained to occur only at operating system time slice intervals.

7. The computer system of claim 1, wherein the processing capabilities of the computer processor cores are defined by one or more of chip area, available resource, and relative speed of the computer processor cores.

8. The computer system of claim 1, wherein the performance measurement and transfer mechanism is configured to move the plurality of executing computer processing jobs amongst the plurality of computer processor cores further based on annotations associated with the computer processing jobs.

9. The computer system of claim 1, wherein the performance measurement and transfer mechanism is configured to further re-assign the plurality of executing computer processing jobs amongst the plurality of computer processor cores by repeatedly performing a test to match the requirements of the plurality of executing computer processing jobs to the processing capabilities of the computer processor cores.

10. A method for operating multiple processor cores, comprising:
obtaining a throughput metric that identifies throughput achieved by a plurality of computer processor cores as a function of workloads running on said computer processor cores, wherein the plurality of computer processor cores are on a single semiconductor die, in which at least two computer processor cores differ in processing capability, and wherein the computer processor cores execute the same instruction set; and
transferring individual ones of a plurality of computer processing jobs amongst targeted ones of said plurality of computer processor cores based on the throughput metric.

11. The method of claim 10, further comprising:
providing for a periodic test to determine relative performance of different computer processing jobs on different ones of the computer processor cores.

12. The method of claim 10, further comprising:
associating workloads for execution on specific processor cores based on annotations associated with the computer processing jobs.

13. The method of claim 10, wherein the throughput metric comprises a number of instructions per second.

14. A computer system, comprising:
a plurality of computer processor cores in which at least two differ in processing performance, and wherein the plurality of computer processor cores are configured to execute the same instruction set; and
a performance measurement and transfer mechanism configured to move a plurality of executing computer processing jobs amongst the plurality of computer processor cores based on a measured throughput metric,
wherein the performance measurement and transfer mechanism is configured to swap execution of the executing computer processing jobs between the computer processor cores for a period of time, monitor resulting performance, and then build a data structure with relative performances of jobs on different types of the computer processor cores.

15. A method for operating multiple processor cores, comprising:
assigning a plurality of computer processing jobs amongst a plurality of computer processor cores, wherein at least two of the computer processor cores differ in size or complexity but execute the same instruction set, and
wherein assigning the plurality of computer processing jobs amongst the plurality of computer processor cores comprises matching requirements of the computer processing jobs to processing capabilities of the computer processor cores based on the sizes or complexities of the computer processor cores.

16. The method of claim 15, further comprising periodically testing to determine relative performance of different computer processing jobs on different ones of the computer processor cores.

17. The method of claim 15, wherein assigning the plurality of computer processing jobs amongst the plurality of computer processor cores is further based on annotations associated with the computer processing jobs.

18. The method of claim 15, further comprising:
repeatedly performing a test to match requirements of the computer processing jobs to the processing capabilities of the computer processor cores; and
re-assigning the plurality of computer processing jobs amongst the plurality of computer processor cores based on the repeated tests.

19. A method for operating multiple processor cores, comprising:
obtaining a throughput metric that identifies throughput achieved by computer processor cores on a single semiconductor die as a function of workloads running on said computer processor cores; and
assigning a plurality of computer processing jobs amongst the computer processor cores based on the throughput metric, wherein at least two of the computer processor cores differ in size or complexity but execute the same instruction set;

transferring the computer processing jobs to a new assignment amongst the computer processor cores;

collecting statistics about execution performance of the computer processing jobs at the new assignment;

determining whether to reassign the computer processing jobs to different computer processor cores based on the statistics collected; and building a data structure with relative performances of the computer processing jobs on different types of computer processor cores based on the statistics collected.

20. The method of claim 19, wherein the determination of whether to reassign the computer processing jobs to different computer processor cores also is based on at least one of a user-defined metric or a workload-defined metric.

21. The method of claim 19, wherein the throughput metric comprises a number of instructions performed per second.

22. The method of claim 19, wherein the throughput metric indicates total system throughput, and wherein the assigning maximizes the total system throughput, as indicated by the throughput metric.

* * * * *